¹

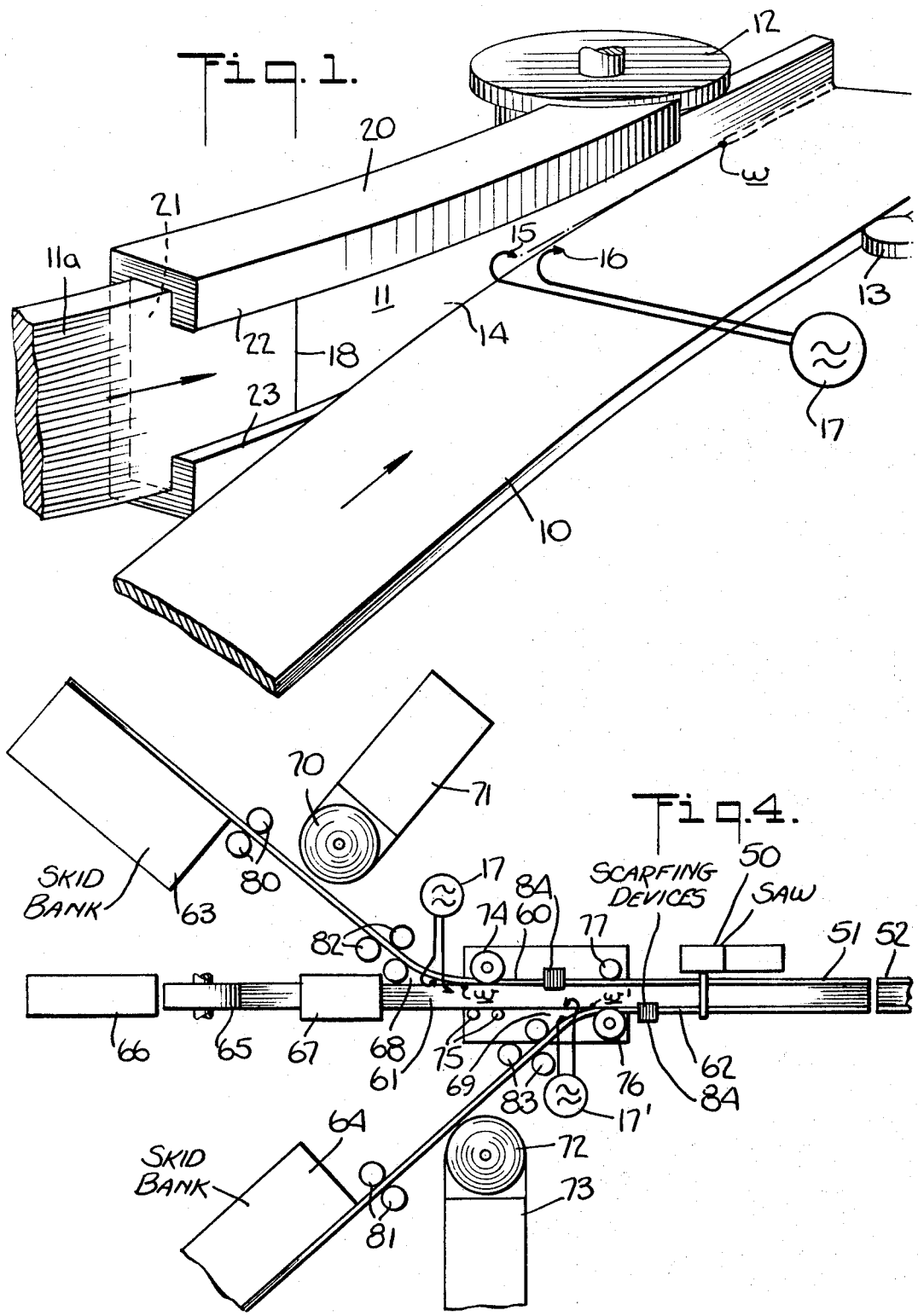

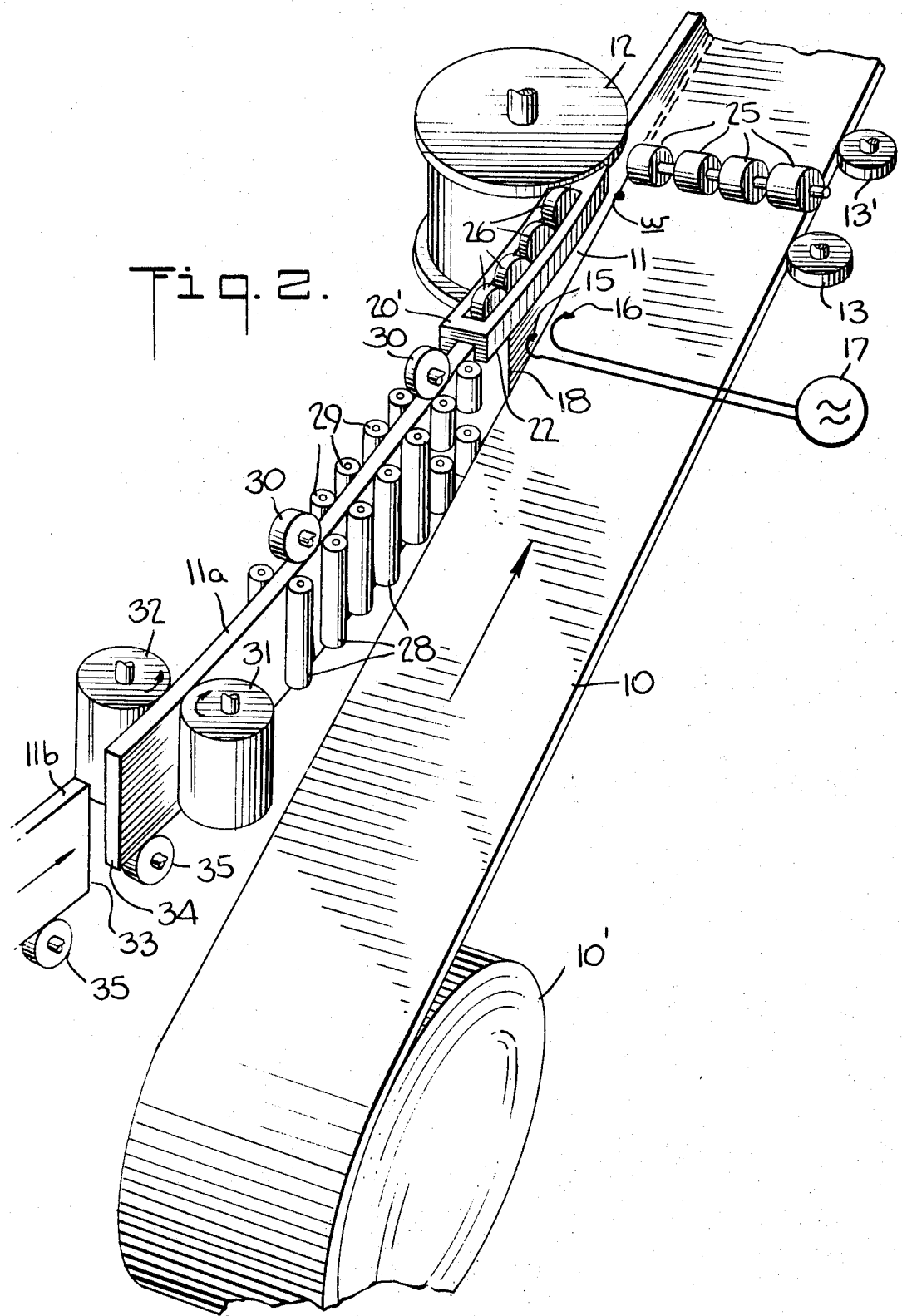

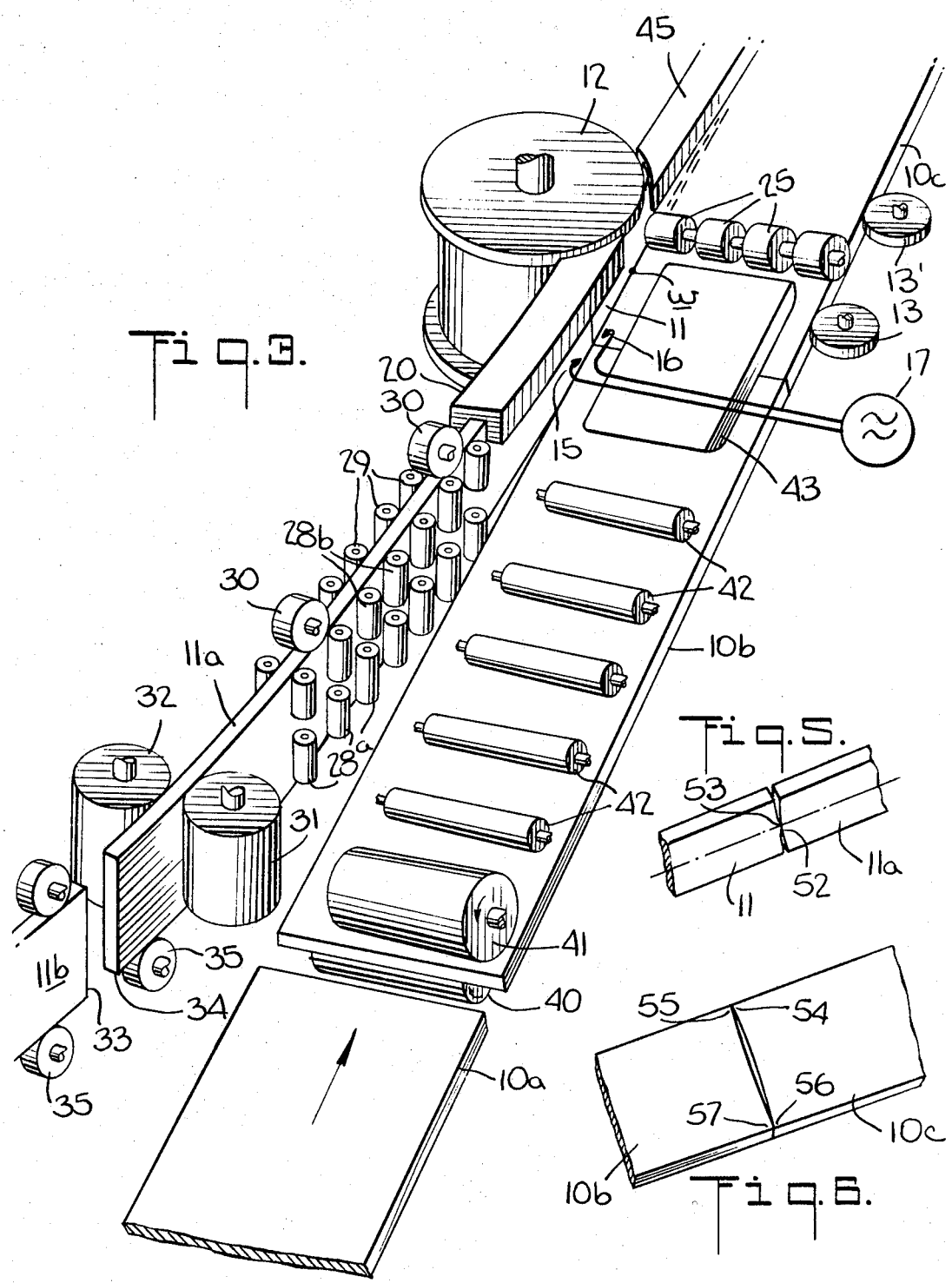

United States Patent Office 3,391,267
Patented July 2, 1968

3,391,267
MANUFACTURE OF WELDED BEAMS
Wallace C. Rudd, Larchmont, N.Y., assignor to American Machine & Foundry Company, New York, N.Y., a corporation of New Jersey
Filed Aug. 4, 1964, Ser. No. 387,471
10 Claims. (Cl. 219—102)

ABSTRACT OF THE DISCLOSURE

Method and apparatus for welding a flange onto the edge of a web, wherein said flange and/or said web is of finite length, by forming a V-shaped gap between the flange and the web for the flowing of high-frequency heating current on the opposed surfaces thereof prior to the weld point, and guiding the end portions of the flange strip up to substantially the position thereof where they are welded to the web, and applying pressure to the weld and flange strip for bringing same into welding engagement at the weld point.

---

This invention relates to the manufacture of welded metal beams and more particularly of types wherein an elongated metal web portion or the like will have welded thereto on one or both of its edges a metal flange-forming strip.

A highly efficient method of welding together elongated metal portions has now come into extensive use according to which the metal portions are rapidly and continuously advanced longitudinally, while the edges thereof which are to be welded together are so advanced as to form a V-shaped gap therebetween, at the apex of which the metal portions are brought together and welded under pressure as the result of heating the metal on the opposed approaching gap edges by causing high frequency current to flow from points thereon respectively in advance of the weld point, thence along the gap edges to and from the weld point or apex of the gap. The current may be applied to the gap edges by the use of contacts, although in some cases the high frequency current may be inductively supplied to the advancing gap edges.

If comparatively heavy beams of so-called H, I or T cross-sections are to be formed by welding together continuously advancing strips by this method, then the difficulty presents itself of economically obtaining such strips long enough to be used in a so-called continuous process. Metal strips heavy enough to form strong beam flanges particularly, cannot well be furnished in coiled form, as is customary for sheet metal strips of lighter gauges. Thus, in order to form the flanges of relatively heavy welded beams, it will be in practice usually necessary or desirable to provide the metal in the form of strips of finite length. The same will be true also as to the strip material used for the beam web, where webs of comparatively heavy metal are required, although in many cases the web may be light enough so that coiled material may be used.

However, if a succession of strips of finite length are to be used end to end to form the beam flanges, using the continuous welding high frequency V-gap method above outlined, it becomes preferable to so advance the succession of flange pieces end to end, that the successive strip surface portions will conform to a gradually and smoothly curved path as they pass along and form one side of the V gap and approach the edge of the web strip at the weld point and without any appreciable interruption of the flange surface presented for welding even where the trailing end of one relatively rigid flange strip abuts the forward end of the succeeding strip. Heretofore, so far as is known, no comparable problem has been met with in utilizing the V gap high frequency continuous welding method referred to above. The present invention, however, provides a highly satisfactory arrangement for solving this problem.

In accordance with one aspect of the invention, the apparatus is so constructed that a succession of finite length flange-forming strips are slidably engaged or encompassed along their edges, so that the succession of strips will be constrained to follow the desired smooth, and preferably curved path up to the weld point, while the longitudinal mid-portions of the surfaces of the strips which advance in opposed relation to the edge of the advancing web strip, will remain uninterrupted and exposed for proper heating and welding to the web edge. And this is so accomplished that the band on the surface of the metal along the mid-portion of the flange strip will be accurately positioned in relation to the web edge which is to become welded thereto.

It should be noted further that, with the above-described V-gap welding method, if same is to be carried on continuously, but with successions of workpieces of finite length, then the current path from the points of application thereof in advance of the weld point on opposite sides of the gap, must be continuously maintained so that the current will flow therefrom, to and from the weld point without interruption, when passing from one strip of finite length to the next. That is, the trailing end portions of each finite length piece must be such as, conjointly with the forward end portions of the next piece, continuously to maintain the current path for uniform heating of the gap edges, since if the current paths were interrupted when passing from one length to the next, or if the gap should be allowed to snap shut prematurely at the end of one piece, then the welded seam would be interrupted or insufficiently heated for forming a good weld over considerable lengths at the forward and trailing ends of the pieces, thereby necessitating cutting off and wasting end portions of considerable length. However, by practicing the present invention as hereinafter described, problems of this nature are avoided.

When sheet metal is manufactured in hot rolled coiled form, there may often be a more or less serious differential in the yield and tensile strengths of the metal as between the leading and tail ends of the coiled metal. This arises from the fact that, if the strip is coiled when hot, the outer portions may cool considerably more rapidly than the inner portions, whereby the latter become annealed and the outer portion will not be annealed to as great a degree. This differential in strength of the material may become a problem in forming structural members from hot-rolled coiled strips. However, this cooling problem does not exist in making steel plate, and hence if the desired structural shapes are made from strips of finite length cut from plate or the like, the strength of the resulting beam may be made more uniform throughout. Yet the use of such finite length strips, in the absence of the present invention, would involve such interruptions or irregularities in the desired continuous welded seam line, that a foot or more of the welded beam structure would have to be cut off and wasted where the tailing and leading ends of the successive strip pieces pass through the welding zone. However, the present invention provides an efficient arrangement for forming not only the beam flanges, but the webs thereof as well, if desired, by using a succession of strips of finite length and with very little loss of waste metal at the strip ends.

Preferably, in accordance with the invention, where the H- or I-beam flanges are formed of strips of finite length, the advance or travel of the successive strips on one side of the web strip, is so synchronized with that on the other side, that the joints in the two flange strips will be directly opposite each other, whereby, subsequent to the welding operation, the beam may be sawed or otherwise cut into lengths by merely severing the web along the tranverse plane of the oppositely positioned joints in the flanges. If the web also is formed of strips of finite length, the advance of the same is so synchronized with the advance of the succession of flange strips, that the resulting beam may be separated into lengths at the transverse planes of the joints without the necessity of cutting any metal other than the weldments.

Various further and more specific objects, features and advantages of the invention will appear from the description given below, taken in connection with the accompanying drawings, illustrating by way of example preferred forms of the invention.

In the drawings:

FIG. 1 is a somewhat diagrammatic perspective view illustrating certain of the essential features of various aspects of the invention in simplified form;

FIG. 2 is another perspective view, also somewhat diagrammatic, illustrating further aspects of the invention which may preferably be used;

FIG. 3 is a view somewhat similar to that of FIG. 2, but illustrating an embodiment of the invention wherein the web material, as well as the flange material, is supplied in finite lengths;

FIG. 4 is a somewhat diagrammatic plan view illustrating a possible embodiment of the invention wherein flanges of an H- or I-beam, one or both being formed either of coiled strips or strips of finite length, are welded substantially concurrently to the edges of a web strip, which may be of coiled form;

FIG. 5 is a view illustrating the manner in which the abutting trailing and forward ends, respectively, of two finite length flange strips, may be so shaped as to insure a continuing path for the high frequency current as the joint therebetween progresses through the welding region; and FIG. 6 is a view similar to FIG. 5, illustrating the manner in which, for like purposes, the abutting ends of the web strips may be shaped. In both FIGS. 5 and 6, the variations in the end formations are shown considerably exaggerated for clearness.

Referring now in further detail to FIG. 1, there is here shown a web strip 10 continuously advancing in the direction shown by the arrow thereon, the strip being pushed past a weld point w by suitable roller means (not shown) and, at the weld point, a succession of flange-forming strips of finite length, as indicated at 11, 11a, are pressed into welded engagement with the web as by the use of a pressure roller 12 engaging the flange material, and another roller 13 engaging the edge of the web strip opposite the weld point.

It will be noted that an edge of the web strip 10 extends along the longitudinal mid-portions of the strips 11, 11a, which, together with the edge of the web strip, form a V-shaped gap 14 with its apex at the weld point w. The strips, such as at 11, 11a, are advanced in the direction of the arrow indicated thereon, by being pushed, as by suitable roller means (not shown), so that the forward end of one length engages the trailing end of the next, and forces same, at the same speed of advance as the web strip 10, past the weld point. In case the high frequency current, for example, is to be applied by the contact method, then contacts as at 15, 16 are applied to the metal at opposite sides of the gap 14, these contacts being supplied with high frequency current from a suitable source 17 and of a frequency, for example, of 50,000 cycles per second or preferably considerably higher, such as 300,000 or 400,000 cycles per second. The current will then pass from the contacts respectively to and from the weld point along the approaching gap edges, causing preferably the very surfaces only of the metal to become heated to the maximum desired welding temperature at the weld point.

The line along which the trailing end of metal portion 11 engages the forward end of metal portion 11a, is indicated at 18. In order to form the desired V gap between the portions to be welded, if the process is to operate smoothly and continuously, the successive web strips preferably should approach the region of the gap along a smoothly-curved surface or path, and even though the strip metal may be relatively thick and rigid against easy flexing. The strip ends should abut, free of any substantial tendency for the trailing end of one strip and the leading end of the next to assume angular positions with respect to each other. Such condition would tend to cause malformation of the weld at the regions of the abutting ends, due to variations which would be caused in the width of the gap at the heating zone and consequent magnified variations in the degree of heating of the approaching portions, arising from the fact that the mutual inductance between the currents flowing on the opposite sides of the gap, would be varied according to a "square law" relation to the variations in the gap dimensions. Also, if irregularities in the weld and the cross-sectional shape of the beam at such joints are to be avoided, the sides of the trailing and leading ends of the flange pieces should abut along a smooth surface, so that irregularities in the effectiveness of the pressure rollers will not occur.

With the arrangement as shown in FIG. 1, these problems of properly advancing the web pieces are overcome by the use of a suitably rigidly supported stationary guide member 20, preferably so formed as to have a longitudinal channel 21 against the back wall of which the back sides of the workpiece strips slidably engage, while the upper and lower edge surfaces of the strips slidably engage the upper and lower wall surfaces respectively within the channel 21. Also, it will be noted that the upper portion of the guide 20 is formed with an overhanging flange portion 22, the interior surface of which is slidably engaged by the side surfaces of the upper portions of the workpieces, and similarly the lower side surfaces of the workpieces are engaged by an upstanding flange formation 23 on the guide 20. Thus, as the succession of workpieces are pushed through this guide means, its interior channel (being shaped with an appropriate curvature) will cause all of the successive surface portions of the flange workpieces to conform to the desired curvature of one side of the V gap at regions in advance of the weld point. In a typical case, the angle of this gap in advance of the weld point may be, for example, about 4 degrees to 7 degrees at the region of the contacts. While the guide 20, in the form shown, is of a generally C-shaped cross-section, it will be appreciated that variations of such cross-section might be used, it being important, however, that the shape be such that the upper and lower front side surface portions of the web pieces be engaged and held in position as they advance, while leaving the mid-portions free to become heated in passing along the gap and to become welded to the edge of the web. It is also of importance that the upper and lower edge surfaces of the flange pieces be so engaged as to insure that the flange pieces will move forward uniformly at the desired and correct elevation with respect to the edge of the web member. In the usual case, in other words, the flange pieces are to be "centered" with respect to the web edge.

Various of the parts of the embodiment of FIG. 2 are the same as those of FIG. 1, and are identified by the same reference characters. Here the web-forming material is drawn from a coil thereof 10' as by suitable rollers (not shown), and the web, as it advances, is suitably supported on its underside by any suitable means, which for simplicity is also omitted from the drawing. The upper surfaces of the web just beyond the weld point, may be engaged by a group of rollers 25, which may either be idler rollers, or suitably driven rollers for pressing the web downwardly against whatever supporting means is provided therefor, while the outer edge of the strip 10 is pressed by the rollers 13, 13' toward the weld point w, there to engage with the flange-forming workpieces. Here the preferably somewhat curved guide 20' is shown as provided along its upper portion with a series of rollers as at 26 for engaging the upper edges of the flange-forming pieces. Similar rollers (not shown) may be provided along the lower edge for engaging the lower edges of the workpieces. These rollers will facilitate the pushing of the workpieces through the welding zone, without undue friction. However, for engaging the side surfaces of the flange-forming workpieces, it will usually be important to provide some form of means which will continuously engage same, and not merely do so at spaced points, as would be the case with a succession of rollers.

However, in advance of the guide 20', if desired, the sides of the strips may be guided by successions of rollers, as at 28, 29. Additional rollers 30 may engage the top and bottom edges. In advance of the rollers 28, 29, the strips are engaged by a pair of power-driven pinch rollers 31, 32, rotating in a direction to push the succession of strips through the apparatus. An additional flange-forming workpiece is indicated at 11b. This (and others following same) may be fed or advanced by suitable roller means (not shown) at a speed such that its advancing end 33 will meet and engage the trailing edge 34 of piece 11a, at least just before the latter passes between the pinch rollers. The approaching strips may be supported on their undersides by suitable rollers, as at 35.

With the embodiment of the invention of FIG. 3, a succession of web-forming strips of finite length are shown as at 10a, 10b and 10c. These are advanced by passing between a pair of horizontally-extending pinch rollers 40, 41, additional strips being fed thereto in a way similar to that by which the flange strips are fed into place, as referred to in connection with FIG. 2. The web-forming strips pass along beneath a succession of guide rollers 42, which press same in flattened condition as they are being advanced along over any suitable desired supporting means thereunder. When these strips arrive at the region of the weld point, same are preferably engaged on their upper surfaces by a web weld guide member 43, which is suitably supported in fixed position and has an undersurface of considerable area, preferably extending from in advance of where the high frequency heating is applied, to a region subsequent to the weld point and for applying sufficient downward pressure to insure that the entire upper surfaces of the web-forming workpieces will be held while being advanced in a position extending along a flat plane and at least until after the weld point is passed.

Subsequent to the squeeze roller 12, the flange on the formed beam may be further guided and stabilized in its path by slidable engagement with suitable guide means 45. In lieu of the rollers, such as indicated at 28 in FIG. 2, it may sometimes prove preferable to engage the sides of the advancing flange workpieces by two sets of rollers as shown in FIG. 3, one set 28a engaging the lower side portions and another set 28b the upper side portions.

Other parts of FIG. 3 correspond to similar parts of FIGS. 1 and 2, and are identified by the same reference characters.

With each of the arrangements above described, provision may be made for simultaneously welding a flange on both sides of the web of the beam in ways such as will be referred to hereinafter in connection with FIG. 4. In cases where the flanges on the opposite sides of the web are made in finite length pieces, it will be understood that the feeding of such pieces into the equipment will be synchronized for both flanges, that is, the pieces will be fed in at such times, and advanced at such rates, that the joints on opposite sides between the finite length pieces, will be directly opposite each other. Hence, when the welded beam, following the welding operations, is to be separated into lengths, this may readily be done as by a saw or other severing means at a position such as indicated at 50 in FIG. 4. This means may be of a suitable known type, synchronized with drive means coordinated with that of the strip-feeding rollers, so that the saw will advance at the same speed as the advancing beam, and will start each severing operation at the location on the beam where the joints in the flanges occur. Thus, in cases where the flanges only are made of finite length pieces, the severing device will need to cut only through the web and the welded seam lines at the points of the joints. In cases where the web as well is made of finite length pieces, it is to be understood that these are to be fed into the welding equipment at such times as to travel in synchronism with the flange pieces so that the joints thereof will occur in alignment with those in the flanges. In such cases, when a welded beam is ready to be severed into lengths, it will be only necessary to cut through the weldments to separate one length from the next. After the beam lengths have been cut off, as indicated at 51 in FIG. 4, same may be conveyed by suitable means, and, if desired, the advancing beam lengths, as at 52, may be tilted downwardly and conveyed away. In case both the flanges and the web are made of finite length pieces, this tilting movement alone may be enough to separate the beam lengths by breaking whatever connections may occur therebetween by reason of the welded seam lines. Preferably the finite length strips used are as nearly as possible of the same length, to avoid discrepancies at the joints therebetween. If variations in the lengths are such that the positions of the joints will accumulate an error after extensive operations, such errors may be minimized by either adopting shorter runs, or by stopping the operations at regular intervals and readjusting the flange pieces into correct relationship with the web pieces.

It should be noted that, if the strips are cut at their ends in an irregular or ragged condition, then the abutting ends, as they pass through the welding zone, might only touch at one or more points other than points at or closely adjacent the desired seam line where the high frequency heating current should pass on the opposed gap edges, properly and uniformly to heat same. In such cases, small gaps in the current path at the abutting ends might occur and this could give rise to an unwelded section, which might extend for a distance as great as the distance between the weld point and the location of the contacts 15 or 16. However, this difficulty may be readily avoided by shaping the ends of the flange-forming pieces in the manner indicated (in a quite exaggerated way) in FIG. 5. Here the trailing end of the piece 11a, for example, is shown protruding rearwardly at its mid-portion 52 at the seam line, slightly further than at other portions. Also, if desired, the forward end of the piece 11 might be so shaped as to protrude at its mid-portion 53 beyond the remaining portions. Thus, if one or both of the ends are shaped as at 52 and 53, this will insure that, as the joint between the two members passes the region where the heating current is supplied, the desired current path will be uninterrupted. Similarly, in cases where the web is made of finite length pieces, as at 10b, 10c (see FIG. 6), here the desired seam lines, in the welding operation, will, of course, extend along the edges of these strips, and thus it will be important to maintain uninterrupted the current path thereon at the edges. This may be accomplished (as shown in FIG. 3 in a considerably exaggerated manner) by so shaping the ends of the pieces that same will be certain of coming into abutment, as at 54, 55 and at 56, 57, at points which are at the edges respectively of the strips.

Reference will now be made to FIG. 4, which is diagrammatically illustrative (in plan view) of a way in which a flange 60 may be welded onto one edge of a web strip 61, while simultaneously, at a point slightly further on, another flange 62 is being welded to the other edge of the web. If the flanges are to be formed of a succession of finite length pieces, same may be successively fed in any suitable way from so-called "skid banks," as at 63, 64, and thence advanced in end-to-end contact through the welding region by guiding means such as described above in connection with FIGS. 1 to 3. Here the web piece may be in the form of a continuing strip drawn from a coil 65, associated with coil storage means 66, the strip being drawn from the coil through suitable flattening means 67, and thence through the welding apparatus. Strip 60 will approach one edge of the web with a V-shaped gap, as at 68, therebetween at the region of the contacts which are fed from the high frequency source of current 17. Strip 62 will similarly approach web 61 at a V-shaped gap 69 at the region where the high frequency current is applied by contacts from source 17′. On the other hand, if the webs are to be formed of continuing strips available in the form of coils, same may come from coils thereof positioned, as indicated at 70, in association with a coil-storage means 71, whereas the strip 62 may come from a coil at 72, associated with a coil-storage means 73. Of course, at or adjacent the position of the respective weld points w and w′, suitable squeeze roller arrangements may be provided, these being indicated at 74, 75 and at 76, 77 respectively. In case finite length flange strips are used, pinch rollers for advancing same may be located as indicated at 80, 81 respectively. Groups of "pyramid" rollers, as at 82 and 83, may be so positioned as to initiate curvatures of the strips as same approach the gaps 68, 69. After each of the flanges has been welded in place on the web, the region of the seam line above and below the web, may be subjected to scarfing by suitable known types of scarfing tools 84, located at the positions indicated. If desired, instead of applying the high frequency current from separate sources for forming the two welds, the heating current may be provided from a single source and with a single series circuit for heating the edges of the two gaps, as disclosed in the application of Fred Kohler and Wallace C. Rudd, Ser. No. 365,578, filed May 7, 1964, entitled "Welding Assemblies of Elongated Members."

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for welding metal flange material to an edge of metal web material to form a succession of beams, comprising in combination: means for rapidly advancing a strip of the web material past a weld point at one edge thereof; means for simultaneously pushing at the same speed a succession of flange-forming strips of finite length in end-to-end abutting relation past said point along a path whereby a V-shaped gap with its apex at said point is maintained between the advancing web edge and the desired seam line along on the side surfaces of the flange strips; means for guiding the abutting end portions of the flange strips in substantially accurate alignment while approaching the weld point, said means for guiding the flange strips guiding said strips from a position in advance of the weld point substantially up to the position thereof where they are welded to the web; means for supplying high frequency heating current to flow on the opposite surfaces of said gap from locations in advance of the weld point to and from said point; means for applying pressure to the web and the strips for bringing same into weld engagement at said point; and means for separating the resulting advancing welded beam into lengths at the locations thereon where the flange strip ends abut each other.

2. Apparatus for welding metal flange material to an edge of metal web material to form beams, comprising in combination: means for rapidly advancing a strip of the web material past a weld point at one edge thereof; means for simultaneously pushing at the same speed a flange-forming strip of finite length along a curved path and past said point, whereby a substantially V-shaped gap with its apex at said point is maintained between the advancing web edge and the desired seam line along on the side surfaces of the flange strip; means for supplying high frequency heating current to flow on the opposite surfaces of said gap from locations in advance of the weld point to and from said point; means for applying pressure to the web and the flange strip for bringing same into welded engagement at said point; and guide means having curved portions slidably engaging along the upper and lower portions of said side surface to retain same in said curved path up to substantially the position thereof where it is welded to the web while leaving intermediate portions of said side surface exposed and free to receive and provide an uninterrupted path for the heating current up to the weld point.

3. Apparatus for welding metal flange material to an edge of metal web material to form a succession of beams, comprising in combination: means for rapidly advancing a succession of web-forming strips of finite lengths in end-to-end abutting relation past a weld point; means for simultaneously pushing at the same speed a succession of flange-forming strips coextensive in lengths and positions with the corresponding flange strips respectively and also in end-to-end abutting relation past said point along a path whereby a substantially V-shaped gap, with its apex at said point, is maintained between the advancing edges of the web strips and the desired seam line along on the side surfaces of the flange strips; means for supplying high frequency heating current to flow on the opposite surfaces of said gap from locations in advance of the weld point to and from said point; means for applying pressure to the web strips and the flange strips for bringing same into welded engagement when passing said point; and means for guiding the side surfaces of the abutting end portions of the flange strips in substantially accurate alignment up to substantially the position thereof where they are welded to the web strips while forming one side of said gap, whereby same provide an uninterrupted and predetermined path for said current, the resulting advancing welded beam being separable into lengths at the locations thereon where the successive strip ends abut each other.

4. Apparatus for welding metal flange material to an edge of metal web material to form beams, comprising in combination: means for rapidly advancing a strip of the web material past a weld point at one edge thereof; means for simultaneously pushing at the same speed a succession of flange-forming strips of finite length in end-to-end abutting relation along a path past said point, such that a substantially V-shaped gap with its apex at said point is maintained between the advancing web edge and the desired seam line along on the side surfaces of the flange strips; means for supplying high frequency heating current to flow on the opposite surfaces of said gap from locations in advance of the weld point to and from said point; means for applying pressure to the web and the strips for bringing same into welded engagement at said point; and guide means having portions slidably engaging along the upper and lower portions of said side surfaces to retain same, including the abutting ends thereof, in alignment and along said path up to substantially the position thereof where they are welded to the web while leaving intermediate portions of said side surfaces exposed and free to receive and provide an uninterrupted path for the heating current up to the weld point.

5. Apparatus in accordance with the foregoing claim 4, and in which said guide means is accompanied by upper and lower series of rollers for engaging respectively the upper and lower edges of the advancing flange strips, to retain same at a predetermined elevation, as they advance, with respect to the edge of the web strip.

6. Method for welding metal flange material to an edge of metal web material to form beams, comprising: rapidly advancing a strip of the web material past a weld point at one edge thereof; simultaneously pushing at the same speed a succession of flange-forming strips of finite length in end-to-end abutting relation along a predetermined path past said point, such that a substantially V-shaped gap with its apex at said point is maintained between the advancing web edge and the desired seam line along on the side surfaces of the flange strips; supplying high frequency heating current to flow on the opposite surfaces of said gap from locations in advance of the weld point to and from said point; applying pressure to the web and the strips for bringing same into welded engagement at said point; and slidably engaging the upper and lower portions of said side surfaces with guide means to retain same in said path up to substantially the position thereof where they are welded to the web while leaving intermediate portions of said side surfaces exposed and free to receive and provide an uninterrupted path for the heating current up to the weld point.

7. Method for welding metal flange material to an edge of metal web material to form beams, comprising: rapidly advancing a strip of the web material past a weld point at one edge thereof; simultaneously pushing at the same speed a succession of flange-forming strips of finite length in end-to-end abutting relation along a predetermined path past said point, such that a substantially V-shaped gap with its apex at said point is maintained between the advancing web edge and the desired seam line along on the side surfaces of the flange strips; supplying high frequency heating current to flow on the opposite surfaces of said gap from locations in advance of the weld point to and from said point; and applying pressure to the web and the strips for bringing same into welded engagement at said point, shaping at least one member of each pair of the abutting ends of said flange strips to form a portion protruding somewhat beyond the remainder of such end at the location of the path of the current on the surfaces of the flange strips, thereby to insure continuity of such current path past such abutting ends.

8. Method for welding metal flange material to an edge of metal web material to form beams, comprising: rapidly advancing a succession of web-forming strips of finite lengths in end-to-end abutting relation past a weld point; simultaneously pushing at the same speed a succession of flange-forming strips, also in end-to-end abutting relation, past said point along a path whereby a substantially V-shaped gap, with its apex at said point, is maintained between the advancing edges of the web strips and the desired seam line along on the side surfaces of the flange strips; supplying high frequency heating current to flow on the opposite surfaces of said gap from locations in advance of the weld point to and from said point; applying pressure to the web strips and the flange strips for bringing same into welded engagement when passing said point; and guiding the side surfaces of the abutting end portions of the flange strips in substantially accurate alignment up to substantially the position thereof where they are welded to the web strips while forming one side of said gap, whereby same provide an uninterrupted and predetermined path for said current.

9. Method for welding metal flange material to an edge of metal web material to form beams, comprising: rapidly advancing a succession of web-forming strips of finite lengths in end-to-end abutting relation past a weld point; simultaneously pushing at the same speed a succession of flange-forming strips, also in end-to-end abutting relation, past said point along a path whereby a substantially V-shaped gap, with its apex at said point, is maintained between the advancing edges of the web strips and the desired seam line along on the side surfaces of the flange strips; supplying high frequency heating current to flow on the opposite surfaces of said gap from locations in advance of the weld point to and from said point; and applying pressure to the web strips and the flange strips for bringing same into welded engagement when passing said point, shaping at least one member of each pair of the abutting ends of said web strips to form a somewhat protruding portion at its edge which passes nearest the weld point, thereby to insure continuity thereon of a path for said current past such abutting ends when approaching the weld point.

10. In apparatus for forming metal beams by welding metal flange strips to edges of metal web strips, means for rapidly advancing a web strip past a weld point at one edge thereof, means for simultaneously advancing at the same speed a flange strip of finite length past said point and along a path whereby a generally V-shaped gap, with its apex at said point, is maintained between the advancing web edge and the desired seam line along on a side surface of the flange strip, means for supplying high frequency heating current to flow along on the opposite sides of said gap from locations in advance of the weld point respectively on said strips and to and from said weld point, means for applying pressure for bringing the strips into welded engagement at said point, said apparatus being characterized by the provision of guide means for the flange strip, said guide means guiding the flange strip from a position in advance of the weld point substantially up to the position thereof where it is welded to the web, portions of such guide means engaging the surface of said strip which faces the web strip edge to retain the trailing end portions of the flange strip in said path while advancing to the weld point, thereby maintaining said gap against closing before said trailing end portions reach the weld point.

References Cited

UNITED STATES PATENTS

| | | | |
|---|---|---|---|
| 2,821,619 | 1/1958 | Rudd | 219—102 |
| 2,922,019 | 1/1960 | Rudd | 219—67 |
| 3,046,382 | 7/1962 | Morris | 219—62 |
| 3,056,883 | 10/1962 | Eisenburger et al. | 219—107 |
| 3,309,003 | 3/1967 | Crawford | 219—62 |
| 3,319,040 | 5/1967 | Rudd | 219—107 |

RICHARD M. WOOD, *Primary Examiner.*

W. D. BROOKS, *Assistant Examiner.*